United States Patent [19]

Kendall

[11] 3,975,565

[45] Aug. 17, 1976

[54] FIBROUS STRUCTURE

[75] Inventor: Matthew Giles Kendall, Runcorn, England

[73] Assignee: Imperial Chemical Industries Limited, London, England

[22] Filed: Oct. 21, 1974

[21] Appl. No.: 516,805

[30] Foreign Application Priority Data

Oct. 30, 1973 United Kingdom............... 50.313/73
Jan. 4, 1974 United Kingdom................. 5019/74

[52] U.S. Cl.............................. 428/284; 28/72.2 R; 156/148; 428/285; 428/300; 428/303; 428/411

[51] Int. Cl.².......................................... B32B 5/06

[58] Field of Search........... 161/154, 155, 156, 170, 161/181, 403, DIG. 4; 156/148; 28/72.2; 428/300, 303, 285, 411

[56] References Cited
UNITED STATES PATENTS

| | | |
|---|---|---|
| 3,338,777 | 8/1967 | Irwin et al............................ 28/72.2 |
| 3,608,166 | 9/1971 | Gruget............................. 28/72.2 R |
| 3,752,721 | 8/1973 | Clark et al.......................... 156/148 |
| 3,778,334 | 12/1973 | Sturgeon............................. 161/156 |

*Primary Examiner*—James J. Bell
*Attorney, Agent, or Firm*—Cushman, Darby & Cushman

[57] ABSTRACT

A composite structure comprising a plurality of interlayered inorganic fiber mats and organic fiber webs held together over the greater part of their areas by needled fibers from at last one of the webs, the needled fibers extending at least part way through one or more of the mats or webs in the thickness direction thereof, the inorganic fibers being staple polycrystalline refractory metal oxide fibers having an average diameter of 0.5 to 5 microns, and the structure having a punch density of 60 to 260 per square inch.

7 Claims, No Drawings

FIBROUS STRUCTURE

This invention relates to a fibrous structure and in particular to a composite fibrous structure comprising inorganic fibers and organic fibers in the form of a needled batt, mat, blanket, felt and the like.

The consolidation and/or densification of inorganic fibers by needle-punching is difficult owing to the relatively low stretch properties and brittleness of such fibers. Needled batts of inorganic fiber are a very desirable product, however. For example, delamination can be reduced and the density of the batt varied for different applications.

We have now found that a satisfactory needled inorganic fiber product may be obtained by needle-punching a combination of a mat of not-woven inorganic fibers and an organic fiber web.

According to the present invention we provide a composite fibrous structure comprising a mat of non-woven inorganic fibers layered with a non-woven web of organic fibers said web being of small thickness compared with the thickness of the said mat wherein needled fibers from said web extend into the body of the mat substantially in the thickness direction thereof to hold the mat and web together over the greater part of their areas to form a unitary structure. In preferred embodiments an organic web provides at least one outer major face of the structure.

The invention thus further provides a fibrous structure comprising a plurality of interlayered inorganic fiber mats and organic fiber webs held together over the greater part of their areas by needled fibers from at least one of the webs extending into and/or through one or more of the mats or webs in the thickness direction thereof.

In many embodiments of the invention, the fibrous structure comprises up to four layers of web and/or mat, for example one web layered with one mat, one mat layered between two webs, or two or three webs with two or three mats wherein a web is alternated with a mat.

The invention also provides a method for making a composite fibrous structure comprising the steps of layering a web of non-woven organic fibers with a mat of non-woven inorganic fibers, the thickness of said web being small compared with the thickness of said mat and needle-punching organic fibers into said mat by subjecting the web to the action of a plurality of reciprocating barbed needles which pass through the web and into the mat substantially in the thickness direction thereof.

It is to be understood that the term "barbed needles" refers to all types of needles known in the art for use in needle-punching operations, and thus embraces forked needles andd other needles provided with any means for engaging fibers during their passage through the web.

In some embodiments more than one web of organic fibers and/or more than one mat of inorganic fibers are used, webs and mats usually being interlayered. When a mat is layered between the webs it is preferable to needle-punch from both sides to detach fibers from both webs and thereby achieve better bonding of the structure. When a web is layered between two mats, needle-punching form both sides is essential to achieve adequate bonding of the layers.

The organic fiber web may be needle-punched to strengthen it; woven fabrics are not preferred as the fibers are less readily liberated therefrom to provide the needled fibers required in forming the structure. Non-woven fabrics made from relatively long staple, for example at least 2 inches long, fibers are especially suitable as fibers of sufficient length are required to penetrate as much of the thickness of the structure as possible and thereby provide good bonding between the layers. The web is preferably light in weight, for example a web weighing about 0.5 to 5 ounces per square yard, preferably 0.75 to 2 ounces per square yard, is especially suitable. Such a web provides sufficient needled fibers without the need to use an excessive mass or thickness of organic material in the structure. In general, the higher the density of the inorganic mat the higher is the density of organic web used. Natural or synthetic fibers may be used in the web. Synthetic fibers are preferred, for example nylon or polyester, but because of their cheapness and effectiveness, viscose (e.g., rayon) fibers are especially preferred. It is sometimes convenient to use a distinctly colored web to assist in identification of a particular face of the structure.

The invention is especially applicable to inorganic fibers of very fine diameter, for example 0.5 to 5 microns average diameter, as fibers of such fineness are generally too weak to be successfully needle-punched directly. Polycrystalline inorganic fibers prepared by dry-spinning of solutions of inorganic compounds, for example refractory metal oxide fibers, of fine diameter have many advantages over vitreous fibers, but when such fibers are collected in mats or blankets, there is a tendency for the mats or blankets to be laid down in laminar form and consequently often need consolidation to avoid delamination. Glass fibers are formed from the melt and the mats or blankets collected from glass fiber spinning processes have less tendency to delaminate. Consequently although some glass fibers may be needle-punched successfully there is generally less need to do so than in the case of staple polycrystalline refractory metal oxide fibers such as those made from solutions of metal compounds by a suitable spinning process. The invention is therefore particularly useful in respect of the consolidation of inorganic fibers prepared by solution-spinning. Alumina and zirconia fibers are particular examples of refractory metal oxide fibers which can be produced in fine diameter from solution of metal compounds and which are especially useful for many applications. Such fibers are conveniently prepared by fibrizing a composition having a viscosity of greater than 1 poise comprising an aqueous solution of a metal compound for example an oxychloride, basic acetate, basic formate or nitrate of aluminum and/or zirconium, and a minor proportion of a water-soluble organic polymer, especially polyvinyl alcohol, polyethylene oxide, polyvinyl pyrrolidone or a polysiloxane, drying the fiber formed and heating to decompose the metal compound to metal oxide and to decompose the polymer. The fibers are normally collected as a random mat. Heating in the presence of steam is often preferred.

Fibrizing is preferably carried out by a blowing process, which comprises extruding the fibrizing composition through one or more apertures into at least one gas stream having a component of high velocity in the direction of travel of the extruded composition. The dimensions and shape of the said aperture may vary widely. We prefer to use an aperture having at least one dimension larger than 50 microns and smaller than 500 microns. The gas stream is preferably air, most preferably air at ambient temperature. It is convenient to employ two streams of gas which converge at or near the point where the composition is extruded from the aperture; preferably the angle between the converging gas streams is from 30° to 60°. At least part of the water in the composition is removed by the stream, and the rate of removal may conveniently be controlled by mixing the gas with the water vapour, for example air at a relative humidity of greater than 80 % may be used. The velocity of the gas stream may be varied over wide limits, but we prefer to use velocities in the region of 200 to 1500 feet per second. The pressure employed to extrude the composition through the apertures will depend on the viscosity of the composition and on the desired rate of extrusion. Pressures from 16 to 100 lb per square inch absolute are convenient for compositions having viscosities up to about 100 poise. The preparation of polycrystalline metal oxide fibers is described in UK patent specification No. 1,360,197 and in our copending UK patent applications Nos. 12088/72 and 36693/72.

Useful composite structures according to the invention comprise interlayered mats of non-woven vitreous and polycrystalline inorganic fibers together with at least one web of non-woven organic fibers held together by needled fibers from the said web. Thus a mat of glass fibers, mineral and clay wool fibers, aluminosilicate fibers or silica fibers may be layered with a mat of a polycrystalline fiber such as zirconia or alumina and needled with a web of an organic fiber. Any combination of such mats may be employed, provided a web of a suitable organic fiber is used as at least one of the layers. Alumina or zirconia fibers prepared as hereinbefore described are especially useful in such composite structures.

By varying the layers, it is possible to determine the refractoriness or thermal conductivity properties of the structures most suited to particular applications, and achieve economies in use. Thus it is possible to combine a very refractory polycrystalline fiber, for example of alumina or zirconia, with a layer of a cheaper, but less refractory, vitreous fiber. In use as a heat insulator such a structure is positioned so that the polycrystalline fiber is adjacent the hot surface to be insulated (the organic web is burned off under the hot conditions in use).

It is important that the gauge of the needle used in needle-punching be small enough to minimise damage to the inorganic fiber mat during passage of the needle through it. Needles thinner than 26 standard wire gauge over the barbed section are preferred especially for zirconia and alumina fibers hereinbefore described, as using needles below this gauge does not reduce the mat strength by more than about a quarter as a result of damage of the inorganic fibre. Needles of 32 and 36 gauge are found to be especially suitable as they are sufficiently thin without being too easily broken in use.

The punch density, that is the number of punching operations per square inch of web, is important in achieving satisfactory bonding of web to mat. Punch densities of 60 to 260 are generally used since below 60 inadequate bonding occurs and above 260 fiber damage results in a more than 25% loss of mat strength.

In most embodiments of the invention the needle-punching operation is conducted in a continuous manner by intermittently advancing the layered web and mat along a predetermined path, the barbed needles penetrating the layers while the said layers are stationary and being withdrawn in order to advance the layers by a predetermined amount to receive a further penetration of the needles. The predetermined amount is commonly referred to as the advance per stroke. In order to avoid local damage to the mat caused by the close proximity of successive penetrations of each needle, it is preferred to employ a relatively large advange of the layers between successive penetrations (advance per stroke, for example 0.2 to 0.6 inch.

To achieve a high punch density with a large advance per stroke, it is necessary to employ as high a needle population as possible. The needle population is the number of needles per inch that an observer sees in a line across the width of the advancing layers and is thus the arithmetical product of the punch density and the advance per stroke. In order to achieve the high needle penetration which allows a large advance of stroke, as many rows of staggered needles as possible are needed in the board on which the needles are mounted.

The barbed needles used in the needle-punching operation generally pass through the layers and project a small distance out of the lowest layer. We find that this distance (known in the art as the penetration)) is conveniently at least 0.5 inch to ensure that the organic fibers are punched into the mat sufficiently far to be effective in bonding the layers.

In order to provide a better understanding of the invention, a method for making the fibrous structures of the invention is now described.

Organic fiber webs and inorganic mats are interleaved in the required sequence and number to give a layered blanket up to about 3 inches thick. The blanket is arranged to have an organic fiber uppermost and is then fed into a conventional single-bed needle loom which comprises a horizontal surface and a needle board arranged to reciprocate in the vertical plane and provided with the usual barbed needles which pass in and out of the layered blanket. In the course of their movement into the layered blanket, the needles pass initially through the top organic fiber web, some of the fibers of which are engaged by the barbs of the needles, after which the needles penetrate the underlying inorganic fiber mat without picking up many inorganic fibers. The organic fibers carried by the barbs from the organic fiber web pass into the inorganic mat; some may protrude beyond the bottom layer of the blanket.

If the layered blanket comprises an inorganic fiber mat sandwiches between the organic fiber webs or an organic fiber web is sandwiched between two inorganic mats, the blanket may be needle-punched in both directions either by inverting the blanket after one passage through the loom and passing it back into the same or a different loom, or by passing the sandwiched blanket into a double-bed needle loom.

When the layered blanket comprises a bottom layer of inorganic fiber mat, this will be in contact with the bed of the loom; it is preferred in such cases to introduce a thin scrim of, for example, an open mesh mutton cloth, between the bed and the mat. The scrim is not bonded to the blanket during the needle-punching operation.

The organic fiber web is usually about 1 to 10% by weight of the inorganic fiber mat. For zirconia or alumina fiber mats of bulk density 1–2 pounds per cubic foot ($lb/ft^3$) prepared as hereinbefore described, an organic fiber web as the top layer only is suitable for producing fibrous structures having a bulk density up to about 3 lb/ft³ or slightly more; for higher densities some interleaving of organic webs and inorganic mats are required if the blanket is made by one pass through the loom. Bulk densities of over 3 lb/ft³ can also be achieved by needling a blanket comprising one organic web and one inorganic mat, inverting the resultant product, placing a further organic web on top and passing again through the loom.

Fibrous structures according to the invention are more dense, have a greatly reduced tendency to delamination and, in embodiments wherein the organic webs comprise the outer layers of the structure, have a less harsh "handle" than the inorganic fiber mats from which they are derived. For some applications, the organic fiber of the structure may be burned off or otherwise removed either during or prior to use; in such cases the inorganic fiber mat may return to its original bulk density depending mainly upon the recovery properties of the fiber. Fibrous structures according to the invention have many uses, for example thermally-resistant layers; noise insulation pads and blankets; filters and other uses in which non-woven inorganic fiber mats find application.

The invention is illustrated by, but not limited to, the following Examples.

EXAMPLE 1.

A layered structure which consisted of the following superimposed layers was constructed.

Top Layer: A fibrous web weighing 0.75 ounce per square yard formed by carding 6 denier, 2 inch long white viscose rayon fibers followed by light needling to improve coherency.

Layer 2: A fibrous mat 0.5 inch thick of bulk density 0.7 pound per cubic foot made of randomly orientated zirconia fibers of diameter 3–5 microns.

Layers 3–5: Identical to the second layer. The layered structure was passed once through a Bywater Multipunch machine operated with a single overhead needleboard fitted with regular barbed 32 gauge needles. The machine was set to give 260 penetrations per square inch with a positive penetration of 0.5 inch through the base of the blanket. The needled product had a density of 3 pound per cubic foot and was 0.75 inch thick. There was no tendency for the blanket to delaminate.

EXAMPLE 2

A product was prepared substantially as described in Example 1 except that a punch density of 130 penetrations per square inch was used instead of 260 penetrations per square inch. The resulting blanket was then turned over and a single layer of rayon web as used in the top layer of Example 1 laid on what had been the underside. The product was then needled a second time with the same gauge of needle at 130 penetrations per square inch to give a blanket of density 4 pound per cubic foot which had no tendency to delaminate coupled with a soft and pleasant surface texture on both faces.

EXAMPLE 3

A layered structure which consisted of the following superimposed layers was constructed.

Top Layer: Viscose rayon web as described in Example 1.

Layers 2–3: Zirconia mat as described in Example 1.

Layer 4: Viscose rayon web as described in Example 1.

Layers 5–6: Zirconia mat as described in Example 1.

The structure was given a single pass through the Bywater Multipunch needling machine fitted with 36 gauge needles and using 180 penetrations per square inch to give a blanket of 3.5 pound per cubic foot with exceptional resistance to delamination by virtue of the additional rayon web incorporated in the center of the product.

EXAMPLE 4

A product was prepared as in Example 1. The resulting blanket was turned over and a layer of black rayon web was placed on what had been the underside of the blanket. Two layers of zirconia mat were then added followed by a final layer of black rayon web. This structure was needled with 32 gauge needles in a second pass at 260 penetrations per square inch to give a composite blanket wherein the density of that part of the blanket which had been twice needled was 4.5 pound per cubic foot while that of the material added just before the second pass was 3 pound per cubic foot. The junction between the parts of different density was defined by a black layer of rayon running through the center of the blanket.

EXAMPLE 5

A layered structure which consisted of the following superimposed layers was constructed.

Top Layer: Viscose rayon web as described in Example 1 but weighing 1.5 ounces per square yard.

Layers 2–4: Zirconia mat as described in Example 1

The structure was given a single pass through the needling machine fitted with 32 gauge needles and using 60 penetrations per square inch to give a blanket of density 0.75 pound per cubic foot. The use of 1.5 ounces per square yard rayon web allowed the production of a coherent blanket in spite of the deliberate use of a low-punch density in order to achieve a lightweight blanket.

EXAMPLE 6

A product was prepared as in Example 1. The resulting blanket was turned over and a layer of black rayon web was placed on what had been the underside of layer 5 of the blanket. A 1-inch thick layer of an alumino-silicate fiber blanket of density 3.0 pound per cubic foot was then added followed by a final layer of black rayon web. This structure was then needled with 32 gauge needles in a pass through a Bywater Multipunch machine at 260 penetrations per square inch to give a composite blanket of density 4.5 pound per cubic foot. This blanket could be used for furnace lining purposes as it comprised a hot-face insulating layer of zirconia fiber backed by the less refractory alumino-silicate fiber on the cooler face. The junction between the parts of different refractoriness was defined by a black layer of rayon running through the center of the blanket, which would normally burn out in use in a furnace.

EXAMPLE 7

A product was prepared as in Example 6 except that the hot-face material consisted of alumina fiber while the cold-face blanket was made from mineral wool.

EXAMPLE 8

A layered structure of the following configuration was constructed.

Top Layer: Viscose rayon web as described in Example 1, but weighing 1½ oz/yd².

Layers 2–3: Each of approximately 1 inch thick zirconia fiber at the bulk density of 4.1 lb/ft³.

The structure was given a single pass through a Bywater Multipunch needling machine fitted with 36 gauge needles using 65 penetrations per square inch to give a blanket of density 5.9 lb/ft³ with greatly reduced tendency to delaminate, and a more pleasant, silky, feel.

EXAMPLE 9

A layered structure based on alumina fiber was prepared.

Top Layer 1½ oz/yd² viscose rayon web, as in Example 8.

Layers 2–4: Fibrous mats of approximately 1/2-inch thick of bulk density approximately 1 lb/ft³ made of randomly orientated alumina fibers of diameter 3–5 microns.

The structure was passed through a Bywater Multipunch needling machine with 32 gauge needles using 176 penetrations per square inch to give a blanket of 3 lb/ft³ at 1 inch thickness which had a greatly reduced tendency to delaminate and which had improved handle characteristics.

EXAMPLE 10

A layered structure based on alumina fiber was constructed as in Example 9 but needled using only 96 penetrations per square inch. This structure was then inverted, a further layer of 1½ oz/yd² viscose rayon web added and passed once more through the needle loom using 96 penetrations per square inch. The blanket produced had a density of 4.2 lb/ft³. It had a greatly reduced tendency to delaminate and had a soft, smooth finish on the top and base surfaces.

EXAMPLE 11

A blanket was prepared with the following layers.

Top Layer: 0.75 oz/yd² viscose rayon web as used in Example 1.

Layers 2–6: Zirconia fiber as used in Example 1, to a total thickness of 3 inches.

This was passed once through the Bywater Multipunch needling machine, using 26 gauge needles and 65 penetrations per square inch. The blanket formed was of 1 inch thickness with much reduced tendency to delaminate but which had a dimpled surface. This blanket was inverted and additional layers added.

Layers 7–9: Zirconia fiber as in Example 1.

Bottom Layer: Viscose rayon web 0.75 oz/yd², as in Example 1.

The blanket was again passed through the Bywater Multipunch needling machine, using the same conditions as used in the first needling operation.

The complete blanket formed was of 1⅛ inch thickness, good appearance and feel to both surfaces, and even more resistance to delamination than that achieved during the first pass. On heating at 1000°C to burn off the organic material, it was found that the strength of the resultant inorganic blanket was lower by about 20% than that measured normally for blankets prepared under similar conditions but using a finer needle, for example 32 gauge.

What we claim is:

1. A composite structure consisting essentially of a plurality of interlayered inorganic fiber mats and organic fiber webs held together over the greater part of their areas by needled fibers from at least one of the said webs, said needled fibers extending at least part way through one or more of the mats in the thickness direction thereof, sufficient to hold the composite together, said inorganic fibers being staple polycrystalline alumina or zirconia fibers having an average diameter of 0.5 to 5 microns, and said structure having a punch density of 60 to 260 per square inch.

2. A structure as claimed in claim 1 comprising two or three mats layered with two or three webs wherein the webs are alternated with the mats.

3. A structure as claimed in claim 1 in which the web is made of organic fibers of at least 2 inches staple.

4. A structure as claimed in claim 1 in which the web of organic fibers weighs 0.5 to 5 ounces per square yard.

5. A structure as claimed in claim 4 wherein the web weights 0.75 to 2 ounces per square yard.

6. A structure as claimed in claim 1 comprising interlayered mats of vitreous and polycrystalline inorganic fibers and at least one organic fiber web.

7. A structure as claimed in claim 6 wherein the vitreous fiber is selected from the group consisting of glass fiber, mineral wool fiber and alumino-silicate fiber.

* * * * *

UNITED STATES PATENT OFFICE
CERTIFICATE OF CORRECTION

Patent No. 3,975,565     Dated  August 17, 1976

Inventor(s) Matthew Giles Kendall

It is certified that error appears in the above-identified patent and that said Letters Patent are hereby corrected as shown below:

In Item [30] Foreign Application Priority Data

"Jan. 4, 1974" should read --Feb. 4, 1974--

Col. 4, line 10, "advange" should be --advance--

Col. 4, line 12, a parenthesis --)-- should be inserted after "inch"

Col. 4, line 51, "sandwiches" should be --sandwiched--

Col. 7, line 21, "1/2-inch" should not be in bold letters.

Signed and Sealed this

Eighth Day of March 1977

[SEAL]

Attest:

RUTH C. MASON
Attesting Officer

C. MARSHALL DANN
Commissioner of Patents and Trademarks